8068X
J. Bateman.
Book Cutting.
No. -
Patented Mar. 12, 1834.
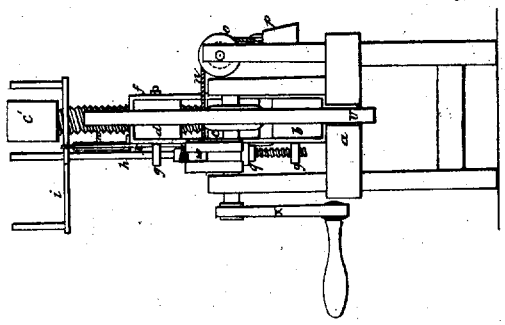
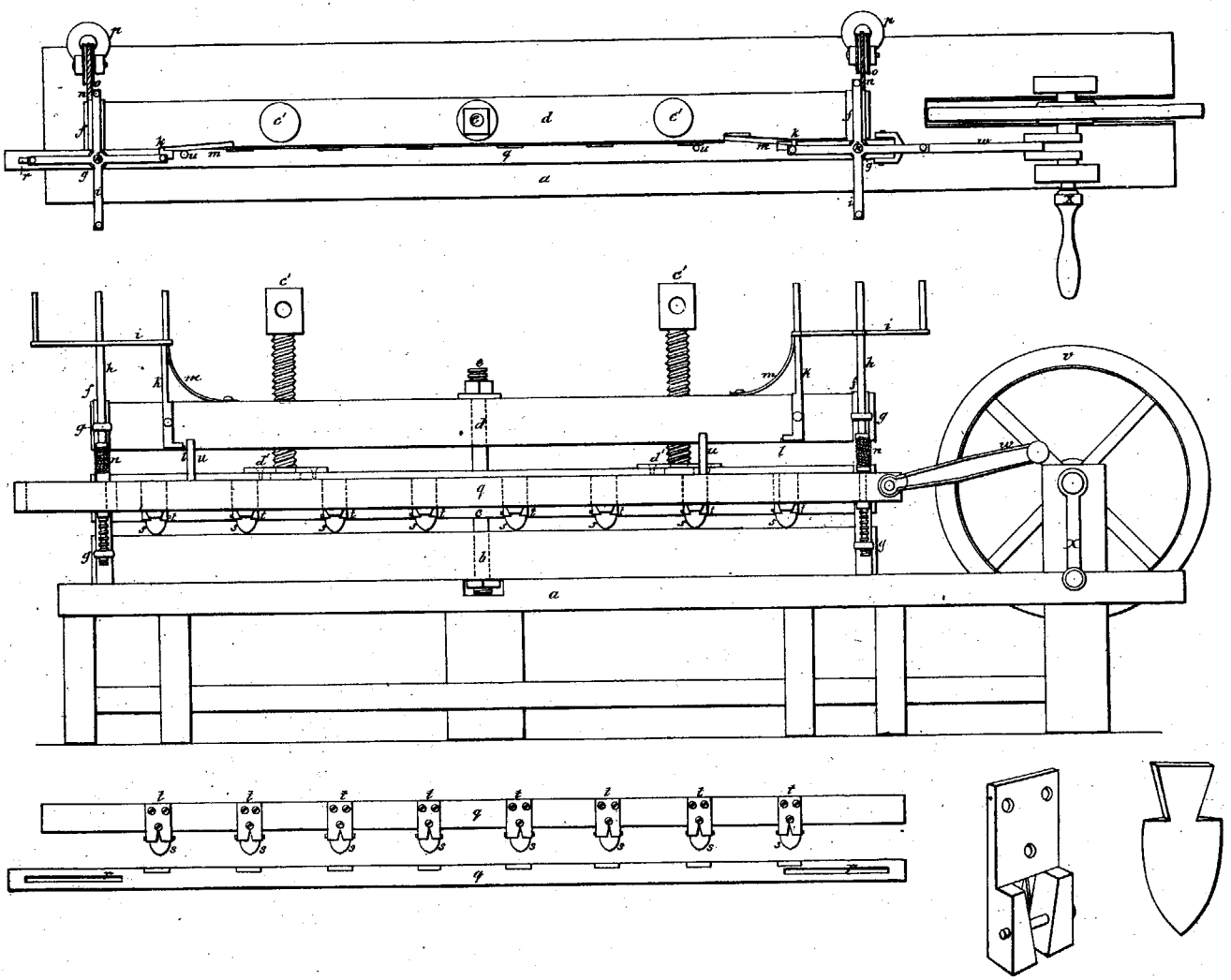

Jonas Bateman
Letters Patent

The Schedule referred to in these Letters Patent and making part
of the same containing a description in the words of the said Jonas Bate-
man himself of his improvement in the machine for cutting or trimming
the edges of Books or Paper.

To all to whom these Presents shall come
Be it known that I Jonas Bateman of Harvard in the county of
Worcester & Commonwealth of Massachusetts have invented a ma-
chine or a new & useful improvement in the art or business of cutting
or trimming the edges of Books & paper & that the following is a
full & exact description of the construction & operation of the said ma-
chine as invented & improved by me to wit. Said machine
consists of three bars made of hard wood eight feet in length &
six inches square placed perpendicularly one above the other the
lower one resting on a bench or platform & confined thereto by
bolts, nuts & screws. The upper bar is confined to the lower bar by
plates of iron half an inch in thickness two inches wide & two feet in
length placed on the outside of the bars near their ends and sunk
their thickness into the bars & made fast by bolts & screws at a prop
er distance from the ends of said bars. this part of the machine is called
the press. The middle bar called the follower plays up & down
between the upper & lower bars with tenons at the ends so as to
play between the plates of iron confining the upper & lower bars
together. In the centre of the bars an half inch iron bolt passes through
all the bars with a head at the bottom and fastened at top by a nut
& screw to prevent the upper & lower bars from springing when in
operation. On the middle bar at equal distances from the centre &
ends are placed two iron plate fastened on with screws. Thro' the
upper bar at corresponding distances with said plates pass two
screws either wood or iron upon said plates & confined thereto
by bolts with heads under side of the plates so as move the mid
dle dle bar or follower up or down by turning the screws one way or the
other. These screws serve to confine the books or paper between the low
er & middle bars so as to be operated upon. Thro the upper & lower
bars one inch from the ends pass in an horizontal direction four
three fourth inch iron bolts with an eye in each three fourths of
an inch in diameter & screws cut in the eyes of the lower ones - said
bolts are confined on the opposite side of the bars with nuts &
screws. In the eyes of these bolts moves two turned iron perpen
dicular shafts with a screw cut six inches on the lower ends
up to the lower bearings & corresponding with the screws cut in
the eyes of the bolts. These shafts are two feet six inches in
length. The lower bearings are three fourths of an inch in length
& an inch & an half in diameter, the shafts are then turned down
to three fourths of an inch in diameter & four inches in length
to play in slits of the bar in which are confined the knives. the
upper bearings of the shafts are five inches in length & one and
an half inch in diameter the shafts are then to their tops turned
to three fourths of an inch diameter On the top of each shaft is
a cross made of half an inch square iron with arms nine inch
-es long & a right angled elbow nine inches from the centre
six inches in length turned up on one of said arms. Said cros
ses are rivetted on to the shafts & move round with the shafts
in an horizontal direction. On the upper bar on the side where said
shafts are two other perpendicular shafts made of half inch iron
fourteen inches long are attached to said bar nine inches distant
from the centre of the large shafts by a screw passing thro said
shafts & the centre of the bar These shafts are flat where they come
against the bar & round where they rise above the bar & so fastened
by the screws as to admit of small longitudinal motion. The lower
ends of these shafts are parallel with the under side of the bar & then
form a right angled elbow towards the centre of the machine of
an inch in length a small pin near the bottom of the bar prevents
the bottoms of these shafts moving towards the centre of the ma-
chine chine. On the top of the upper bar & the same side with the last described shafts are attached two steel springs nine inches in length upon a quarter circle & the tops resting against said last described shafts so as to intercept the motion of the crosses by coming in contact with the arms. On the upper bearings of the two large perpendicular shafts are attached cords passing horizontally to the opposite side on to a pulley & block & to the ends of said cords are attached weights which cause the pressure of the knives downwards when the machine is in operation. The bar which contains the knives is nine feet two inches long two and an half inches thick & four inches in depth with central perpendicular slits or mortises three fourths of an inch in width at each end said slits or mortises are a foot at one end & a foot & two inches at the wheel end. These slits play backwards & forwards upon the large perpendicular shafts & keep the bar containing the knives steady in its place when the machine is in motion. In the last mentioned bar or slide are fixed eight knives made in the fashion of those commonly used placed at one foot distance from each other beginning one foot from the opposite end containing the wheel. The knives are dovetailed into the sockets with slits in the sockets up to the bar or slide. The sockets are let into the bar or slide on the side next the press so as to form an even surface & fastened by screws. In that part of the sockets with slits below the bar a small bolt passes thro' one half & enters a screw in the other half so as to confine the knives tight in their places. On the upper part of the bar or slide containing the knives is an iron pin six inches long which by coming in contact with the lower end of the shafts fastened to the upper bar [illegible] the upper part of said shafts against the springs towards the centre so as to permit one arm of the crosses on the large shafts to pass which lowers the bar containing the knives. At eighteen inches distance from one end of the press two posts twelve inches in height with sockets for a crank to turn in sufficiently braced steadily to carry a cast iron wheel upon the crank three feet feet in diameter & weighing one hundred pounds & runs partly
in a mortise cut thro' the bench or platform are erected on the side
on which the crank is turned it is so bent as to form a sweep of six
inches to which a reach or fetch fastened to a bolt in the bar or slide
containing the knives also fastened by a socket. The crank is fur-
ther so bent as to form another sweep of a foot at the handle taken
hold of to turn it. By means of the connexion of the reach or fetch
with the shaft of the crank & the bar or slide containing the knives
to move in an horizontal direction alternately one foot each
way at every revolution of the wheel & at each alternate movement
the bar by means of the shafts & springs cords weights & screws is
lowered & pressed down upon the book or paper to be cut or trim
med by the knives. These machines may be made on a larger
or smaller scale than the one above described & with a grea-
ter or lesser number of knives & they may be operated with by
manual water or other power. The principles of this machine
of which the said Jonas Bateman claims to be the inventor or
discoverer are the simultaneous use of so many knives & brought
to bear upon the books or paper to be cut or trimmed by turning
the balance wheel & the consequent operation of the weights, shafts,
screws & springs above described Witnesses Jonas Bateman Moses Smith John Huntington Exd.
W.C.

[1521 [illegible]